United States Patent Office 3,176,051
Patented Mar. 30, 1965

3,176,051
BLENDED POLYETHYLENE COMPOSITION
Razmic S. Gregorian and Frank A. Mirabile, Silver Spring, Md., assignors to W. R. Grace & Co., New York, N.Y., a corporation of Connecticut
No Drawing. Filed Aug. 19, 1960, Ser. No. 50,592
5 Claims. (Cl. 260—878)

This invention recites a method of making a polyethylene composition. More particularly, it relates a method of forming a polyethylene composition of superior clarity to polyethylene of equivalent melt index or reduced viscosity produced by direct polymerization.

Polymers of ethylene such as those described in Belgian Patent 533,362 issued to K. Ziegler and in U.S. 2,816,883, issued to Larchar et al., are well known in the art today and are generally characterized by their organic solvent solubility and thermoplastic or flow properties. Polyethylenes produced in accordance with the aforesaid patent references are herein considered to be high density polyethylene, i.e., having a density in the range of 0.94–0.97. The high density polyethylene described in Belgian Patent 533,362, issued November 16, 1954, is obtained by subjecting ethylene at a pressure in the range of 10 to 100 atmospheres and the temperature in the range 50 to 250° C. in an inert solvent to the action of a catalyst consisting essentially of a titanium or zirconium halide and an aluminum alkyl.

The advent of high density polyethylene introduced many problems in the commercial field. For instance, in comparison with conventional low density polyethylene (0.92) as described in U.S. 2,153,553 issued to E. Fawcett et al., high density polyethylene has an inferior clarity.

Lately, several methods have been tried to improve the clarity of high density polyethylene to foster their commercial acceptability in fields, e.g., films, coating, etc., wherein clarity is a requisite. The art has discovered that crosslinking of high density polyethylene improves the clarity thereof, and various methods have been employed in this direction. Such methods include crosslinking by irradiation and also by chemical reaction using, e.g., peroxides, diperoxides, hydroperoxides or azo-compounds as crosslinking agents, followed by subjecting the polymer to a curing step at elevated temperatures in order to obtain improved clarity. However, it must be mentioned that the aforesaid crosslinking methods to improve clarity have the drawback that processing operations subsequent to crosslinking such as extrusion, molding, or the like to put the crosslinked polymer in the form of a shaped article to be passed on to the general public can only, if at all, be performed with the greatest difficulty. This is so because the substantially uniform crosslinking throughout the polymeric material greatly decreases the flow properties of the material to the point whereat the material is mainly thermoset instead of thermoplastic. Therefore, it is necessary in most cases to carry out all operations necessary to put the polymeric material in its final form, e.g., extrusion, molding, etc., before subjecting it to a crosslinking and curing operation to obtain improved clarity. Such a procedure is unworkable in the commercial field since small retailers who are equipped to perform only the necessary extrusion, molding, and similar operations neither can afford nor possess the know-how to perform subsequent crosslinking operations by irradiation or otherwise. Additionally, the cost of returning the uncrosslinked shaped article to the polymer manufacturer for processing for improved clarity by crosslinking and curing would be prohibitive. Thus, a method to produce a polyethylene and especially high density polyethylene having improved clarity properties and which, because of its flow properties can be subjected to subsequent shaping operations is a desideratum.

It has recently been discovered by one of us in a copending application having Serial No. 24,652, filed April 26, 1960, that blending a major portion of a parent polymer consisting essentially of polyethylene which has not been subjected to a crosslinking operation with a minor amount of a crosslinked polyethylene additive at a temperature above the melting point of the parent polymer will yield polyethylene having greatly improved clarity which can be subjected to subsequent processing and shaping operations. This aforesaid latter discovery, however, has the drawback in that the crosslinking operation requires high radiation dosages of the additive, e.g., 1–10 megarads in order to obtain the necessary degree of crosslinking to insure improved clarity in the parent polymer. Such high radiation dosages are costly and time-consuming.

Surprisingly, it has now been found that a polyethylene composition formed by blending a major portion of a parent polymer of polyethylene having a density of 0.94–0.97 and a melt index in the range 1.0 to 10 with a minor amount between 0.1 to 10% by weight of said composition of an additive consisting essentially of a member of the group consisting of polyethylene having a reduced viscosity of at least 2.9 and a copolymer of 1-butene and ethylene having a reduced viscosity of 4.0 will yield a polyethylene composition having greatly improved clarity.

The high molecular weight additives of the instant invention can be made by various methods. For example the additive members of the group consisting of polyethylene having a reduced viscosity in the range 2.9 to 10 and a copolymer of 1-butene and ethylene having a reduced viscosity in the range 4.0 to 10 can be prepared in accordance with the methods disclosed in Belgian Patent 557,968. Another method of preparing the high molecular weight additive is disclosed in Belgian Patent 577,455. This latter method is used herein in the control run in Example 4.

The reason for the improvement in clarity of the parent polymer is not known at this time. It is known that in a parent polyethylene and especially high density polyethylene, on cooling below its melting point, the crystallites form spherulites. Large spherulites refract light thereby making the polymer translucent or opaque. On this basis it was theorized that if an additive is uniformly admixed with the parent polymer at temperatures above the flow point of the parent polymer, on cooling, it would either act as nucleation sites for the crystallite growth of the parent polymer or interfere with the crystallization growth in such a way that many small spherulites instead of larger spherulites would result. Since the smaller spherulites do not refract light, transparency of the parent polymer is obtained.

Another possible and somewhat similar explanation for the improved clarity would be that the additive in the system, though fluid above the melting point of the parent polymer, crystallizes faster than the parent polymer and thus nucleates crystallization of the parent polymer in such a fashion as to prevent large spherulite formation. However, applicants do not wish to be bound by any theory. Suffice it to say that the admixture of an additive consisting essentially of a member of the group consisting of polyethylene having a reduced viscosity of at least 2.9 and a copolymer of 1-butene and ethylene having a reduced viscosity of at least 4.0 with a parent polymer of high density polyethylene at temperatures above the melting point will yield a polyethylene composition having greatly improved clarity.

The amount of additive to be blended with the parent polymer of ethylene in accordance with the instant invention is nominal in comparison to the increased clarity afforded thereby. Amounts of additive equal to about 0.1 to 15% by weight of the blended composition are operable. Even greater amounts are workable but are unnecessary. A preferred amount of additive is in the range 0.5 to 10% by weight of the blended polyethylene composition.

The additives employed in the invention are of such high molecular weight that melt index measurements above 0.0 are not obtainable. Therefore, the flow properties which are an indication of processability are measured as a function of the additive's reduced viscosity. For any given amount of additive the higher the reduced viscosity of the additive the less processable the blended composition. Thus care must be exercised in the amount of highly viscous additive admixed in the blend to improve clarity when the parent polymer has a low melt index, i.e., 0.5 as additive amounts in excess of 10% of the blend may render the blended composition unprocessable. Obviously, if the parent polymer has a higher melt index, greater amounts of highly viscous additive can be added.

The blending operation is performed at or above the melting point of the parent polymer. Temperatures ranging from the melting point of the parent polymer up to 200° C. or more are operable. A preferred temperature range for high density polyethylene is 130–175° C.

The additive may be blended with the parent polymer by various methods. One method of blending would be to add the parent polymer of polyethylene to a polymerization reactor and thereafter polymerize the additive in situ. Should it happen that the in situ polymerization temperature is not sufficient to melt the parent polymer, then following the polymerization step, the reaction temperature can be increased to a temperature above the melting point of the parent polymer to insure a blend of the thus-polymerized additive and the parent polymer in situ. Conversely the additive may be added to a polymerization reactor and the parent polymer polymerized in situ at temperatures insuring that a blend of the additive and the parent polymer will be obtained. Yet another method of blending the additive with the parent polymer is the use of conventional mechanisms such as a Brabender Plastograph, or a Banbury mixer maintained at temperatures above the melting point of the parent polymer. Additionally, it is also possible to feed the additive and the parent polyethylene polymer at preset rates into the hopper of an extrusion or molding machine and accomplish the blending in the heated barrel thereof immediately preceding the shaping operation.

The flow properties of the polyethylene product produced by the instant invention are described as a function of the melt index. A polyethylene product which evidences a high melt index has a low melt viscosity and therefore better flow properties. The melt index of the parent polyethylene is not critical and can be varied under a broad range within which the material is workable in processing or shaping operations. An operable range of melt indices for the parent polymer is 0.5–10.

The reduced viscosity of the polyethylene additive operable in the instant invention can be in the range of 2.9 to 10 or more. To insure processability a lesser amount of the more viscous polyethylene additive is employed. Such amounts are readily determined by one skilled in the art within the range herein disclosed. The reduced viscosity of the additive consisting of the copolymer of ethylene and 1-butene which is operable in the present invention is in the range 4.0 to 10 or more. The reduced viscosities ($\eta_{sp}/C$) used herein were measured in decalin at 135° C. using the method described in ASTMD 1601–58T. The concentration of the polymer solution used to obtain the reduced viscosity was 0.1 g. polymer or copolymer/100 ml. decalin solution at 135° C.

Throughout the instant invention the melt indices (MI) were measured under the conditions specified in ASTMD 1238–52T; the densities of the polymer were measured in a density gradient tube by the Bell Laboratories Proposed ASTMD Method for the Measurement of Density of Solid Plastics by the Density Gradient Technique.

The clarity test devised specifically for evaluation of changes in the clarity of polyethylene consists of viewing, through a ½" diameter hole centered in a horizontal sample table holding clarity test samples thereon, a glowing filament from a 2-watt concentrated arc lamp (Sylvania C2/DC point light source), the extreme tip of said filament being situated 3 inches below the bottom surface of said test sample. The clarity test samples are prepared by molding under 10,000 lbs. pressure at 350° F. and then air cooling to room temperature for unquenched samples or immersing in a $H_2O$ bath at room temperature for quenched samples. The results of the clarity test are expressed in terms of the clarity number (mils) which is defined as the maximum thickness of the sample in mils through which the glowing filament, as viewed from 1 foot above the sample table, can still be observed.

The following examples will aid in explaining the instant invention but are not to be deemed to be limiting in its scope.

In the examples all parts and percentages are by weight.

*Example 1*

To 38 grams of commercial polyethylene having a density of 0.960 and a melt index of 1.0 were added an additive consisting of 1.149 grams of polyethylene having a reduced viscosity of 4.5. The admixture was charged to a Brabender Plastograph and milled for about 4 minutes at a temperature of 160° C. The resultant blended polyethylene product had a melt index of 0.741. Samples of the product were prepared for clarity tests by compression molding the samples into thin sheets (5–10 mils thick) on a Carver press, at 10,000 lbs. pressure at a temperature of 350° F. and thereafter cooling a portion of the samples in air to room temperature for unquenched clarity test samples and quenching the remainder of the samples in $H_2O$ at room temperature for quenched clarity test samples. Using the clarity test mentioned supra the unquenched sample of the blended product had a clarity number of 29 and the quenched sample had a clarity number of 93 mils. As can be seen by the melt index of the resultant blended polyethylene product the flow properties of the product were not substantially decreased.

In a control run 38 grams of commercial polyethylene having a density of 0.960 and a melt index of 1.0 were charged to the Brabender Plastograph and milled under the same conditions as the blended product in this example. The product from the control run had a melt index of 0.93 and a clarity number of 4 mils unquenched and 12 mils quenched.

A comparison of the clarity numbers of the blended product with the control product shows that the clarity of the blended sample increased 7 times as much in both the quenched and unquenched state over that of the control product.

*Example 2*

The procedure and reactants of Example 1 were followed excepting that only 1.149 grams of polyethylene additive having a reduced viscosity of 4.5 was used as an additive. The resultant product after blending on a Brabender Plastograph for about 4 minutes at 160° C. had a melt index of 0.913. Clarity tests of the resultant polyethylene product resulted in a clarity number of 20 mils for the unquenched sample and 57 mils for the quenched sample. Comparison of the blended products resulting from Examples 1 and 2 show that the larger amount of additive used in Example 1 exhibits higher clarity but a lower melt index than that in Example 2. Therefore, as would be expected, processability as shown by the decrease in melt index is decreased with an increase in the amount of additive. Thus it is necessary for any specific composition to balance clarity required in the composition with the processability required thereby.

Example 3

To 38 grams of commercial polyethylene having a density of 0.960 and a melt index of 1.0 was added 1.14 grams of an additive consisting of a copolymer of 1-butene and ethylene having a density of 0.935 and a reduced viscosity of 4.3. The admixture was charged to a Brabender Plastograph and milled for about 4 minutes at a temperature of 160° C. The resultant polyethylene product had a melt index of 0.81 and clarity test samples thereof resulted in a clarity number of 29 for the unquenched sample and 65 mils for the quenched sample. The percent increase in clarity was greater than 500% as compared to the control sample in Example 1.

To show feasibility of forming the additive in situ, the following example was performed.

Example 4

A 1 liter stainless steel stirred polymerization reactor previously purged with nitrogen and containing 400 ml. of cyclohexane was charged with 20 grams of commercial polyethylene pellets having a density of 0.960 and a melt index of 0.7. The reactor was heated to 50° C. with agitation and charged with a catalyst consisting essentially of 0.62 gram $AlCl_3$, 1.02 grams tin tetraphenyl and 0.008 gram of $VOCl_3$ under 100 pounds nitrogen. The reactor was then pressured to 200 p.s.i.g. with ethylene and polymerization allowed to occur. After 20 minutes the pressure dropped from 200 p.s.i.g. to 100 p.s.i.g. The reactor was then vented and an additional 15 grams of commercial polyethylene pellets having a density of 0.96 and a melt index of 0.7 were added to the reactor. The reactor was then heated to about 130° C. for an additional 30 minutes. The blended polymer product removed from the autoclave was transferred to a beaker and purified by refluxing in an alcoholic acid, i.e., HCl-methanol, followed by filtration and drying. The dried blended product weighed 38 grams and had a melt index of 0.10. An unquenched sample of the dried blended product had a clarity number of 114 mils.

A control run using the procedure and catalyst of Example 4 except that no parent polyethylene was added to the reactor, resulted in the polymerization of a polyethylene additive which had a reduced viscosity of 2.9.

A blended polyethylene composition of the instant invention can be utilized in various operations wherein improved clarity is required. Thus, the polyethylene composition can be used in film for packaging of articles such as toys, etc.

We claim:

1. A blended composition, comprising polyethylene having a density in the range 0.94 to 0.97 and a melt index in the range 0.5 to 10 and a minor amount, between 0.1 to 10% by weight of said composition of an additive member of the group consisting of polyethylene having a reduced viscosity in the range 2.9 to 10 and a copolymer of ethylene and 1-butene having a reduced viscosity in the range 4.0 to 10.

2. A process for producing a polyethylene composition of improved clarity which comprises blending polyethylene having a density in the range 0.94 to 0.97 and a melt index in the range 0.5 to 10 at a temperature above its melting point with a minor amount between 0.1 to 10% by weight of said composition of an additive selected from the group consisting of polyethylene having a reduced viscosity in the range 2.9 to 10 and a copolymer of ethylene and 1-butene having a reduced viscosity in the range 4.0 to 10.

3. A process for producing a blended polyethylene composition of improved clarity which comprises adding a member of the group consisting of polyethylene having a reduced viscosity in the range 2.9 to 10 and a copolymer of ethylene and 1-butene having a reduced viscosity in the range 4.0 to 10 in an amount between 0.1 to 10% by weight of said composition to a polymerization reactor containing an inert hydrocarbon solvent and an ethylene polymerization catalyst, heating the reactor to an operable polymerization temperature in the range 130° C. to 200° C., adding ethylene until a pressure in the range of 10 to 100 atmospheres is obtained in the reactor, thus forming a polyethylene having a density in the range 0.94–0.97 and a melt index in the range 0.5 to 10.0 and thereafter recovering the blended polyethylene composition.

4. A process for producing a blended polyethylene composition of improved clarity which comprises adding polyethylene having a density of 0.960 and a melt index of 0.7 in an amount equal to about 90% by weight of the aforesaid composition to a polymerization reactor containing an inert hydrocarbon solvent, heating the reactor to 50° C. adding a catalyst consisting essentially of $AlCl_3$, tin tetraphenyl and $VOCl_3$ in a 59.4:36.1:1 mole ratio respectively, pressurizing the reactor with ethylene until a pressure of 200 p.s.i.g. is obtained in the reactor and thereafter recovering said blended polyethylene composition.

5. In the method of forming a blend of 99.9–90% polyethylene and a 0.1–10% by weight of copolymer of 1-butene and ethylene by copolymerizing 1-butene and ethylene in the presence of preformed polyethylene having a density in the range 0.94–0.97 and a melt index in the range 0.5 to 10.0, the improvement comprising copolymerizing 1-butene and ethylene to a copolymer of 1-butene and ethylene having a reduced viscosity in the range 4.0 to 10.

References Cited by the Examiner

UNITED STATES PATENTS

| | | | |
|---|---|---|---|
| 2,691,647 | 10/54 | Field et al. | 260—897 |
| 2,791,576 | 5/57 | Field et al. | 260—897 |
| 2,868,762 | 1/59 | Oaks | 260—897 |
| 2,956,035 | 10/60 | Mock | 260—897 |
| 2,969,340 | 1/61 | Kaufman et al. | 260—897 |
| 2,983,704 | 5/61 | Roedel | 260—897 |

MURRAY TILLMAN, *Primary Examiner.*

D. ARNOLD, LEON J. BERCOVITZ, *Examiners.*